United States Patent [19]

Lashomb

[11] Patent Number: 4,850,393
[45] Date of Patent: Jul. 25, 1989

[54] ALL-PLASTIC CHECK VALVE

[75] Inventor: Donald A. Lashomb, Cranberry Lake, N.Y.

[73] Assignee: Rockland Form-A-Plastic, Inc., Cranberry Lake, N.Y.

[21] Appl. No.: 227,542

[22] Filed: Aug. 1, 1988

[51] Int. Cl.[4] .............................................. F16K 15/14
[52] U.S. Cl. .................................. 137/528; 137/843; 604/45; 604/247
[58] Field of Search ................... 137/528, 533, 533.11, 137/533.17, 533.19, 843, 519; 604/9, 45, 99, 247

[56] References Cited

U.S. PATENT DOCUMENTS

| | | |
|---|---|---|
| 2,960,994 | 11/1960 | Shaffer .............................. 137/533 X |
| 3,113,587 | 12/1963 | Hendley . |
| 3,626,980 | 12/1971 | Svensson . |
| 3,768,102 | 10/1973 | Kwan-Gett et al. . |
| 3,797,522 | 3/1974 | Carleton .............................. 137/528 |
| 3,967,645 | 6/1976 | Gregory . |
| 4,005,710 | 2/1977 | Zeddies .............................. 137/533 X |
| 4,158,362 | 6/1979 | Durrett et al. . |

FOREIGN PATENT DOCUMENTS

| | | |
|---|---|---|
| 1191240 | 4/1965 | Fed. Rep. of Germany ........................ 137/533.11 |
| 1413224 | 9/1964 | France ............................... 137/843 |

*Primary Examiner*—Robert G. Nilson
*Attorney, Agent, or Firm*—Wall and Roehrig

[57] ABSTRACT

An all-plastic check valve is incorporated into a molded plastic surgical or medical device. A tubular arm of the device serves as a barrel of the one-way check valve and has a unitarily molded seat or sealing ring and a plurality of protuberances or keeper bumps. A hollow cone-shaped or bullet-shaped stopper permits fluid flow in one direction, but in the back direction lodges against the sealing ring or seat. The material of the stopper is softer than the material of the tubular portion. At least limited flexing is possible without breaking the seal.

17 Claims, 1 Drawing Sheet

ALL-PLASTIC CHECK VALVE

BACKGROUND OF THE INVENTION

This invention relates to one-way check valve assemblies, and is more particularly directed to a check valve whose seat portion can be formed of a flexible material and unitarily with a peripheral item, such as a barium enema tip.

Previous check valves for air or fluid passage typically have a ball or similar stopper and a tubular member that contains a seat. For medical or surgical uses, the seal should be as good as possible.

One type of valve construction made for high sealing (i.e., low leakage) characteristics requires that the stopper and seat be made to a high degree of accuracy. The precision of fit of the stopper in the seat determines how well the valve seals. This is easiest to achieve with all-metal valves, because steel, brass, and other metals are easily machined to the required precision, and materials are dimensionally stable. However, with this construction, these valves are quite expensive and are not considered disposable, nor can they be incorporated unitarily into a periheral device. This design of valve is unsuited for construction from molded plastic parts, especially from flexible plastic resins which by their nature are dimensionally unstable.

Another proposal involves employing a soft material for the valve seat and a ball type stopper of hard metal or glass. This reduces the requirement for precision, because the soft seat material can conform to the shape of the stopper to effect a good seal. However, because the seat material is soft, a rigid barrel is required to house the valve seat. The soft material of the seat, in order to be soft enough to conform, has to be too soft also for dimensional stability. The upshot of this is that the seat cannot simply be formed as a unitary part of a peripheral device, because the device would either be too flexible for it to function in its own role, or too rigid to serve as a flexible seat check valve. Also, if the seat is formed inside a part of a peripheral device that is made of a flexible material, then as the device itself is flexed even slightly, the seat distorts and the seal between the hard ball stopper and the seat will break.

If a soft material is used for the stopper, this also reduces the requirement for precision because the stopper can conform to the shape of the seat. In this case, the materials requirement for seat can be somewhat less critical. Nevertheless, if conventional shapes, or profiles are employed for the seat and stopper, there is a tendency for the seat to deform and break the seal even under normal operating conditions. If the seat and its enclosing barrel are not rigid, and the stopper is a spherical member, there is a risk that the seal will break, if the seal is even slightly deformed. Other forms use either a rigid seat with a flat face or a flexible seal in a rigid barrel.

OBJECTS AND SUMMARY OF THE INVENTION

It is an object of this invention to provide a check valve that avoids the drawbacks of the prior art.

It is another object of this invention to provide a check valve that can be made entirely of molded plastic parts, and in which the seat portion can be unitarily molded as a part of a peripheral device such as a barium enema tip or a urinary drain.

It is yet another object of this invention to provide a check valve that can withstand significant flexing without risk of breaking the seal.

It is still another object to provide a check valve that can be dip-molded of polyvinyl chloride or another suitable synthetic resin, which can be manufactured at low cost, and which avoids dimensional criticality.

In accordance with an aspect of this invention, a check valve is formed of a tubular member which can be an arm of a medical or surgical device such as a barium enema tip, and a flexible hollow stopper or obturator within the tubular member. The tubular member and the main body of the medical or surgical device can be molded unitarily out of a flexible plastic material such as PVC. The stopper can also be molded of a PVC, preferably somewhat softer than the tubular member. The stopper is hollow and generally conic or bullet shaped with a parabolic profile to its nose and an open skirt at the end opposite the nose. There is a sealing ring or annular seat molded onto the interior of the tubular member. The seat with the nose of the stopper when the fluid in the check valves tries to flow in the back or reverse direction. There are a number of keeper bumps spaced from the sealing ring or seat on the interior of the tubular member to retain the stopper inside the check valve, but to permit flow of fluid over the stopper in the forward direction.

The tubular member and seat can be of a comparatively stiff material (Shore A hardness of 60 to 70) while the stopper is of comparatively soft material (Shore A hardness of 40 to 50).

The parts can all be dip molded of soft or extra soft PVC. With the cone-shaped stopper, neither the seat nor the stopper needs to be perfect. The dimensional tolerances are quite low and a round shape is not critical.

The valve seat can be molded as part of a peripheral device, such as the enema tip, a urinary irrigation wye, a tubing connector, etc. The stopper moves away from the seat to permit flow in the forward direction, but slides against the seat to seal and prevent flow in the opposite or reverse direction.

The hollow flexible stopper is far more reliable than a rigid ball stopper and is far cheaper and more convenient to produce. The parabolic shape of the stopper nose minimizes the resistance to flow in the forward direction.

The above and many other objects, features, and advantages of this invention will become more fully understood from a consideration of the ensuing description of a preferred embodiment when read in connection with the accompanying drawing.

DETAILED DESCRIPTION OF A PREFERRED EMBODIMENT

Figure 1:
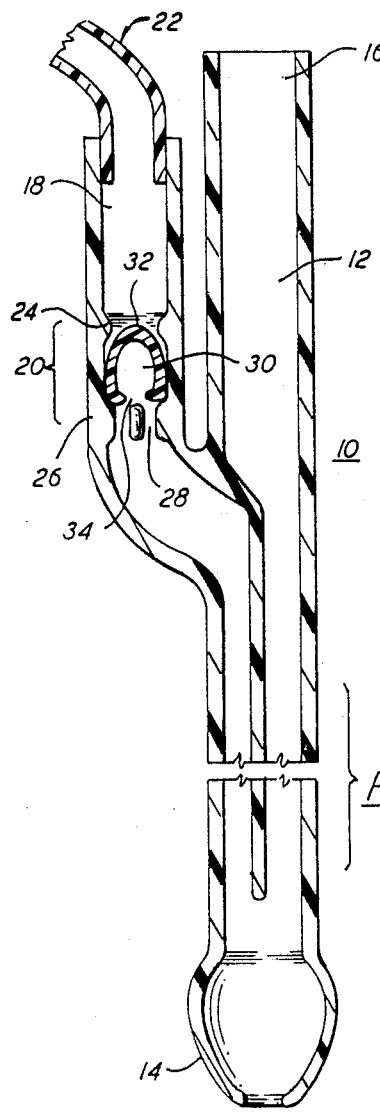
FIG. 1. is a sectional view of a medical or surgical device, namely a barium enema tip, an which incorporates a check valve according to one embodiment of this invention.

With reference to the drawing, and initially to FIG. 1 thereof, barium enema tip 10 is illustrated in section, and this device incorporates a check valve according to one embodiment of this invention. The barium enema tip 10 is unitarily formed of a firm, flexible plastic material, such as polyvinyl cholride, typically with a durometer Shore A hardness of 60 to 70. The device consists of a main tubular body 12 which has a bulbous tip 14 at its distal end for inserting rectally into a patient, and an open proximal end through which a barium enema is injected. This end 16 can be closed off with a suitable clamp (not shown).

A tubular side arm 18 is formed unitarily with the body 12 of the barium enema tip and has a check valve 20 incorporated in it. Tubing 22 is inserted into the arm 18 and supplies air for inflating the patient's colon. The check valve 20 permits air flow into the patient, but prevents air flow out in the back direction, e.g., so that the patient's colon will remain inflated during a radiographic procedure.

Figures 2, 3:
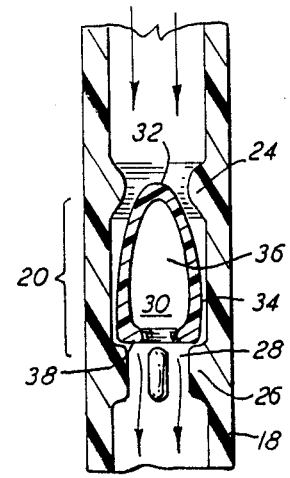
FIGS. 2 and 3 are partial sectional views of the check valve used to permit forward flow and block reverse flow, respectively.

As shown in greater detail in FIGS. 2 and 3, the check valve 20 comprises an annular seating ring 24 on the inner surface of the tubular arm 18 at the proximal side of the check valve 20, and a number of protuberances 26 or keeper bumps at the distal side of the check valve 20. In this embodiment there are three such keeper bumps. The seating ring 24 and the protuberances 26 are formed unitarily in the arm 18 and the main body 12, for example, by dip molding. The protuberances 26 are spaced axially from the ring 24 and are also spaced circumferentially from one another so as to define air passages 28 between them.

A stopper or obturator 30 is formed of a soft plastic resin, such as polyvinyl chloride, and can typically have a shore A hardness of 40 to 50. The stopper 30 is generally cone shaped, and is hollow. The stopper is long and narrow, being of slightly smaller diameter than the inside diameter of the tubular arm 18. The stopper proximal end 32 is formed as a closed nose of parabolic profile, and the opposite or distal end is an open skirt 34. The stopper 30 has a hollow parabolic interior, and preferably there is a reinforcing ring or ridge 38 formed on the interior 36 at the distal end.

In FIG. 2, air flow is in the direction of the arrows. The stopper 30 slides in the tubular arm 18 and is restrained by the protuberances 26. The parabolic nose 32 provides a minimum of resistance to air flow; the air flowing over the outside surface and through the passages 28 between the keepers or protuberances 26. However, when return air pressure is in the reverse direction, illustrated by the arrows in FIG. 3. The reverse or back pressure urges the stopper 30 proximally until its nose 32 lodges against the seating ring 24 to form a seal. The stopper 30 appears to the air flow as a cup, which helps to move it quickly against the sealing ring 24. The effect of back pressure is to push the stopper 30 against the sealing ring 24 thus to effect the seal. As the stopper 30 is of softer material than the ring 24, the stopper tends to wrap itself onto the surface of the ring to effect a secure seal.

It has been discovered that the arm 18 can be deflected significantly without rupturing the seal between the stopper 30 and the seating ring 24. While the amount of permissible deflection depends on the specific construction of the device, and on the characteristics of the plastic materials used. In practice, with a medical or surgical device such as that illustrated in FIG. 1, the arm containing the check valve 20 can be flexed up to about 45 degrees, deforming the check valve but without breaking the seal.

Figure 4:
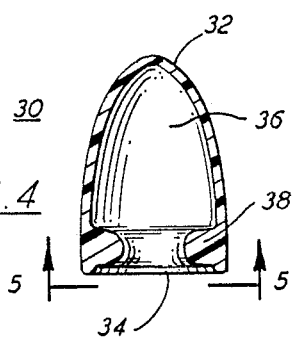
FIG. 4. is a sectional view of a stopper according to one embodiment of this invention.
Figure 5:
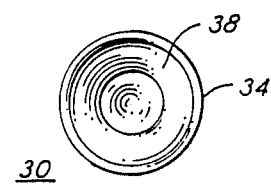
FIG. 5 is a bottom plan view taken at line 5—5 of FIG. 4.

As shown in FIGS. 4 and 5, the presence of the reinforcing ring 38 permits the nose 32 of the stopper 30 to be formed of extremely thin material. This achieves optimum flexibility and sealing power. The ring 38 prevents the thin-walled stopper 30 from collapsing and being urged past the keepers or protuberances 26 when the air moves past it in the forward, or flow direction.

Figure 6:
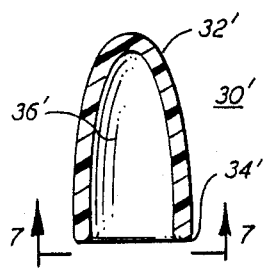
FIG. 6 is a sectional view of a stopper according to a second embodiment of this invention.
Figure 7:
FIG. 7 is a bottom plan view taken at line 7—7 of FIG. 6.

As illustrated in FIGS. 6 and 7, an alternative embodiment could employ a stopper 30' whose wall is of substantially uniform thickness from the nose 32' to the open end 34' thereof. In this embodiment, the reinforcing ring is omitted. In each of the embodiments shown here, the hollow nose portion 32 or 32' is thin walled, and of substantially uniform wall thickness at least in the vicinity of contact with the seating ring 24.

Because of the flexible and hollow nature of the parts involved, this type of construction lends itself readily to dip molding in polyvinyl chloride. The construction is highly reliable while having low manufacturing tolerances and only two parts. The high flexibility of the check valve 20 makes it highly suitable for incorporation into any desired medical or surgical device, in a straight tubular section, or any other peripheral device.

While the invention has been described with respect to a preferred embodiment, it should be understood that the invention is not limited to that embodiment, but that many modifications and variations could present themselves to those skilled in the art without departing from the scope and spirit of this invention, as defined in the appended claims.

What is claimed is:

1. A check valve comprising a tubular member through which a fluid is conducted and a hollow flexible stopper member slidably disposed within said tubular member and having a closed nose portion at a first end and an open skirt at a second end, said nose portion being hollow and having a thin wall of generally uniform thickness thereover, said tubular member having an annular valve seat formed on an inner surface of said tubular member and at least one keeper member protruding radially inward on the inner surface of said tubular member and spaced a predetermined distance from said annular seat; said nose portion sealing against said seat to block the fluid flow in a back direction, and said at least one keeper contacting said open skirt to retain said flexible stopper member to retain the same in said tubular member when said fluid is flowing therethrough in a forward direction.

2. A check valve according to claim 1 wherein said stopper member is generally cone-shaped.

3. A check valve according to claim 1 wherein said stopper member nose portion is generally parabolic.

4. A check valve comprising a tubular member through which a fluid is conducted and a hollow flexible stopper member slidably disposed within said tubular member and having a closed nose portion at a first end and an open skirt at a second end, said tubular member having an annular valve seat formed on an inner surface of said tubular member and at least one keeper member protruding radially inward on the inner surface of said tubular member and spaced a predetermined distance from said annular seat; said nose portion sealing against said seat to block the fluid in a back direction, and said at least one keeper contacting said open skirt to retain said flexible stopper member to retain the same in said tubular member when said fluid is flowing therethrough in a forward direction, wherein said stopper member includes a reinforcing ring unitarily molded into an interior surface of said open skirt.

5. A flexible all-plastic check valve which comprises a tubular flexible plastic member through which a fluid is conducted in one direction but whose flow is blocked in the other direction, and a flexible plastic obturator member freely retained in said tubular member; wherein said obturator member is elongated with a first end which is rounded and closed, and a second end which is broad and hollow, said first end being similarly curved inside and outside to define a thin wall of generally uniform thickness; and wherein said tubular plastic member includes an annular valve seat formed unitarily therewith on an inner surface thereof to seal with said first end of said obturator member when said fluid is urged in said other direction, and keeper means unitarily formed in said tubular member spaced a predetermined distance from the annular valve seat to retain said obturator member when said fluid flows in said one direction.

6. A flexible all-plastic check valve according to claim 5 wherein said obturator member is of a softer plastic material than said tubular member.

7. A flexible all-plastic check valve according to claim 6 wherein said obturator member and said tubular member have Shore A durometer hardnesses in the ranges of 40 to 50 and 60 to 70, respectively.

8. A flexible all-plastic check valve according to claim 5 wherein said obturator is generally cone-shaped and hollow.

9. A flexible all-plastic check valve according to claim 8 wherein said first end is generally parabolic in profile.

10. A flexible all-plastic check valve according to claim 5 wherein said keeper means comprises a plurality of inwardly directed protuberances formed on the inner surface of the tubular member.

11. A flexible all-plastic check valve which comprises a tubular flexible plastic member through which a fluid is conducted in one direction but whose flow is blocked in the other direction, and a flexible plastic obturator member freely retained in said tubular member; wherein said obturator member is elongated with a first end which is hollow, rounded and closed, and a second end which is broad and hollow wherein said obturator at its second end has a reinforcing ring unitarily formed on an interior surface thereof; and wherein said tubular plastic member includes an annular valve seat formed unitarily therewith on an inner surface thereof to seal with said first end of said obturator member when said fluid is urged in said other direction, and keeper means unitarily formed in said tubular member spaced a predetermined distance from the annular valve seat to retain said obturator member when said fluid flows in said one direction.

12. A molded plastic device comprising a hollow plastic body and a unitarily formed tubular member coupled to said body and through which a fluid flows in one direction, a portion of said tubular member serving as a one-way check valve permitting said fluid to flow in said one direction but blocking the flow in the other direction; the check valve including an elongated flexible plastic obturator member freely retained within said portion of the tubular member having a first end which is hollow rounded and closed and a second end which is broad and hollow, said first end having a thin wall of a generally uniform thickness thereover, an annular valve seat unitarily formed on an inner surface of the tubular member to seal with the first end of said obturator member when said fluid is urged in said other direction, and keeper means unitarily formed in said tubular member and spaced a predetermined distance from said annular valve seat for retaining said obturator member within said portion of the tubular member when said fluid flows in said one direction.

13. A molded plastic device according to claim 12 wherein said obturator is generally a hollow a bullet-shaped member.

14. A molded plastic device according to claim 12 wherein said body and tubular member are molded of a material of a Shore A durometer hardness of substantially 60 to 70, and said obturator member is molded of a material of a Shore A durometer hardness of substantially 40 to 50.

15. A molded plastic device according to claim 12 wherein said device is a surgical or medical device.

16. A flexible all plastic check valve which comprises a tubular flexible plastic member through which a fluid is conducted in one direction but whose flow is blocked in the other direction, and a flexible plastic obturator member freely retained in said tubular member, wherein said tubular plastic member includes an annular valve seat formed unitarily therewith on an inner surface thereof to seal with a surface of said obturator member when fluid is urged in said other direction, and keeper means unitarily formed in said tubular member spaced from said annular valve seat to retain said obturator member when said fluid is flowing through the tubular member in said one direction, said obturator member including means permitting significant flexing of the tubular member when said obturator member is urged against the annular valve seat without breaking the seal formed between the obturator member and the valve seat, wherein said obturator member is formed of a softer plastic material than said tubular member and said means permitting significant flexing includes a hollow nose portion in said obturator having a thin wall of substantially uniform thickness at least at the portion thereof that contacts said annular valve seat.

17. A flexible all plastic check valve according to claim 16 wherein said tubular member is molded of a material of a Shore A durometer hardness of substantially 60 to 70, and said obturator member is molded of a material of a shore A durometer hardness of substantially 40 to 50.

* * * * *